(12) United States Patent
Moon et al.

(10) Patent No.: US 7,546,221 B2
(45) Date of Patent: Jun. 9, 2009

(54) CREATING AND USING APPLICABLE INFORMATION TECHNOLOGY SERVICE MAPS

(75) Inventors: Carroll Wayne Moon, Matthews, NC (US); Neal R. Myerson, Seattle, WA (US); Susan K. Pallini, Windham, NH (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 11/343,980

(22) Filed: Jan. 31, 2006

(65) Prior Publication Data
US 2007/0100930 A1    May 3, 2007

Related U.S. Application Data

(60) Provisional application No. 60/732,894, filed on Nov. 2, 2005.

(51) Int. Cl.
*G06F 15/00* (2006.01)

(52) U.S. Cl. .................................. 702/186; 709/219

(58) Field of Classification Search ................. 702/186, 702/187, 188; 709/200, 219, 223; 707/10
See application file for complete search history.

(56) References Cited

U.S. PATENT DOCUMENTS

2005/0216573 A1*  9/2005  Gutjahr ................ 709/219

\* cited by examiner

*Primary Examiner*—Bryan Bui
(74) *Attorney, Agent, or Firm*—Workman Nydegger

(57) ABSTRACT

The present invention extends to methods, systems, and computer program products for creating and using applicable information technology maps. Defined rules that indicate how information technology services interrelate to other computing components in the information technology infrastructure are received. A specified level of detail is selected, from among one or more levels of detail in taxonomy for the information technology infrastructure, for presenting the service map of the information technology service. Ownership for components that are to be presented in the service map is associated with specified responsible entities. The service map is created with the specified level of detail. The service map can then be accessed and utilized to discretely apply a process theory to the information technology infrastructure.

20 Claims, 5 Drawing Sheets

CREATING AND USING APPLICABLE INFORMATION TECHNOLOGY SERVICE MAPS

CROSS-REFERENCE TO RELATED APPLICATIONS

The present application claims priority to U.S. Provisional Patent Application Ser. No. 60/732,894, filed Nov. 2, 2005, and entitled "Creating And Using Applicable Information Technology Service Maps", which provisional application is incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of information technology services at computer systems and/or other electronic devices via wired and/or wireless computer networks.

Many network environments include multiple interrelated information technology services. For example, a network environment can include file transfer systems, electronic mail systems, backup systems, firewall systems, database systems, anti-virus systems, etc. Some of these services may rely on other services to implement their own functionality. For example, a file transfer service may rely on an anti-virus service to reduce the possibility of transfer a file infected with a computer virus.

A service can connect to (e.g., interoperate with and/or rely on) many other services. Thus, it is difficult, if not, impossible for a human to visualize and/or understand a complete view of a service's functionality and interoperation with/reliance on other services. For example, during operation a file transfer service may connect to firewalls, internal and external DNS, dedicated circuits, back-up services, electronic mail services, external and internal networks, database services, etc. Further, each of these services may also connect to multiple other services. Changing any one service can thus have an impact on a number of other services. Further, different services may be under the control of different administrators, some of which are outsourced. This results in a number of problems.

Due at least to the difficulty in visualizing and understanding all of the connected services in a network environment, it can be difficult, if not impossible, to implement reliable change management. That is, it can be difficult, if not impossible, for an administrator to reliably change one service without adversely impacting one or more other connected services. For example, when a change is requested, it is quite difficult to know who should have input into the decision and who should be communicated to. Thus, changes to services that support another are frequently made in a vacuum without input from or communication to the impact parties.

It can also be difficult, if not impossible, to implement reliable configuration management. Current configuration management solutions may indicate what needs to be done, but provide little if any guidance how to do it. Thus implementing configuration management results in inconsistency, lessened value, and increased expense.

Further, in all but relatively small infrastructures, managing baselines on a node-by-node basis (e.g., per computer) is time consuming, costly, and leads to discrepancies between nodes that perform similar services. Further, identifying dependencies for complex information technology services proves very difficult and is often based on the customer's implementation of the technology. Additionally, creating documentation is an arduous task in a distributed environment. Most people have their own idea of what an operations guide, a support guide, a continuity plan, etc should look like. Not having a consistent scope for documentation makes knowledge management very difficult. Some, mechanisms have been developed to manage configurations on a node-by-node basis (i.e., server x should have settings 1-n), but in an enterprise environment, managing configurations on an individual basis is very time consuming and error prone. Further, even with such none-by-node solutions, release management is not addressed.

It can also be difficult, if not impossible, to implement reliable release management. That is, information technology organization cannot apply the concepts of release management to their distributed environments in a discreet manner which makes testing more difficult, increases costs, increases complexity, increases business risk due to inadequate documentation, etc. Some mechanisms teach proactively scheduling, testing, and deploying one or more changes in quantifiable groupings called 'releases' along with associated documentation and version numbers.

However, implementing this concept in a distributed infrastructure is very difficult because it is generally not feasible to have only one type of hardware, one operating system, and applications that can be installed without drastically changing the system itself (e.g., registry changes). The problem is exacerbated by the fact that the hardware models that are in production do not have identical drivers, firmware, etc and operating systems are generally not at the same service pack, OS, and registry tweak levels. This fact means that releases would have to be made on a node-by-node basis (costly) or a high-level, generic release is used which leads to inaccurate and out-of-date documentation. In addition, testing is virtually impossible do to the combinations of hardware, OS, and other software; the number of possible case scenarios escalates very quickly.

It can also be difficult, if not impossible, to implement reliable incident management. Escalating incidents are problematic at least because dependencies and relationships between the services and information technology groups are not well defined. If a user calls with an email problem, the incident may be routed to the messaging group when in fact it is a networking issue. Some mechanisms define an escalation process that is functional (increasing technical prowess) and/or hierarchical (increasing management levels) escalations. In the current world, however, these escalations are problematic because the components, dependencies, etc for information technology services are often not well understood, for example, by frontline staff.

It can also be difficult, if not impossible, to implement reliable problem management. Without a more complete view of connected information technology services, information technology managers often focus their (limited) resources on the latest emergency (a micro view) instead of the larger areas for improvement (a macro view). Thus, information technology managers often fail to identify operating trends in information technology services.

It can also be difficult, if not impossible, to implement reliable service level management. Operating Level Agreements (OLAs) are blanket agreements between groups within an information technology organization. Without a more complete view of connected information technology service, OLAs often lack an appropriate level of granularity. That is, OLAs are generally high level and don't accurately represent business requirements. Take for example an OLA between a Messaging team and a Network team. That OLA might contain an agreement for how quickly the Network team should respond to an outage that impacts the Messaging team. At least one problem with this kind of blanket agreement is that all services provided by messaging may not have the same business criticality. As a result, high priority services will not get the required response time since it is grouped with less important services OR lower priority services that don't require rapid response will, in fact, recieve rapid response and therefore costs are unnecessarily increased.

It can also be difficult, if not impossible, to implement reliable availability management. Without a more complete view of connected information technology services, information technology organizations typically analyze risks, plan mitigations, and contingencies at a higher service level. Thus, information technology organizations do not identify many actionable risks and leave their information technology services and the Vital Business Functions that they support at risk. For example, design decisions for availability are often made in isolation. Since no single group of architects can cover every possible failure mode some risks are not identified. Thus, an information technology organization may employ additional personnel to attempt to identify as many risks as possible. Accordingly, in the end, information technology organizations end up spending too many resources or adding complexity for difficult availability measures or they knowingly (or unknowingly) leave risks unaddressed.

Without a more complete view of connected information technology services creation of troubleshooting and resolution guides is also more difficult. No one author can know everything and combining authors leads to inconsistency. In addition, delegating support to front line staff members is complex because front line staff members, by definition, support a broad array of technologies and information technology Services. Thus, it is difficult for front line staff members to be masters of all trades. It is also difficult for top-tier staff to package up their knowledge in a way that is consumable by front line staff. Thus, cost of support and duration of outages is increased as the majority of outages are typically routed to top tier staff or better skilled resources that are more expensive have to fill the front line roles.

It can also be difficult, if not impossible, to implement reliable service continuality management. Without a more complete view of connected information technology services, information technology organizations frequently leave mission critical information technology services at risk by not incorporating all supporting services into their continuity plans. For example, planning for non-routine failures (e.g. floods) is a difficult, costly, and problematic process. Many times, even if a business decides to implement a continuity plan for a service (and therefore expend the resources), they are still left at risk since at least some supporting and connected information technology services are not accounted for in the plans. For example, if an electronic mail service is determined to need a continuity plan, an information technology organization may not take into account the need for a connected directory service to also have a continuity plan, even though the electronic mail service will not work properly without the directory service.

In some environments, the general operations of services are also adversely impacted. Without a more complete view of connected information technology services, an absence of adequate, discreet operations guides can result. This in turn leads to routine operational tasks not being defined or completed which leads to increased cost and failures. Similar to the problems associated with support guides, most individuals have differing ideas of what should go into an operations guide. Therefore, a single individual creates an operations guide for an information technology service, but that there is no way that a single individual can be an expert in every supporting area. On the other hand, multiple people might write operations guides for each product, but the guidance will not be consistent.

As mentioned above some mechanisms have attempted to solve some of the above-listed problems. While these mechanisms may provide higher level guidance on what is to be done to solve a problem they provide no practical solution on how to implement a solution. Thus, these mechanisms are primarily theory. Applying these theories a distributed information technology services environment can prove to be quite difficult. Further, these mechanisms are technology independent, and thus the theory has to be high level to apply broadly across platforms. Accordingly, such theory is not directly applicable in a distributed information technology infrastructure.

BRIEF SUMMARY

The present invention extends to methods, systems, and computer program products for creating and using applicable information technology maps. In some embodiments, an applicable service map of a plurality of information technology resources included in an information technology infrastructure is created. Rules that indicate how information technology services interrelate to other computing components in the information technology infrastructure are defined. A service map is defined at a first level of detail. The first level of detail representative of a lesser detailed view of an information technology service. The service map is defined at a second level of detail. The second level of detail representative of a more detailed view of the information technology service and indicating the information technology service's primary dependencies on other components in the information technology infrastructure.

A taxonomy for representing additional levels of detail in the service map of the information technology service is identified. The additional levels of detail being different than the first and second levels of detail and indicating further components and characteristics of components presented at the first and second level of detail. A specified level of detail for presenting the service map of the information technology service is identified. Ownership for components that are to be presented in the service map are associated with specified responsible entities. The service map of the information technology service is presented with the specified level of detail. The service map includes components indicated for presentation at the specified level of detail and corresponding entities responsible for the ownership and accountability of the included components.

In other embodiments, an information technology service map is used to simplify information technology infrastructure management. An information technology service map that maps a corresponding information technology infrastructure with a specified level of detail is accessed. The information technology service map represents dependencies between services and streams included in the information technology service map. The information technology service map is utilized to discretely apply a process theory to the information technology infrastructure.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
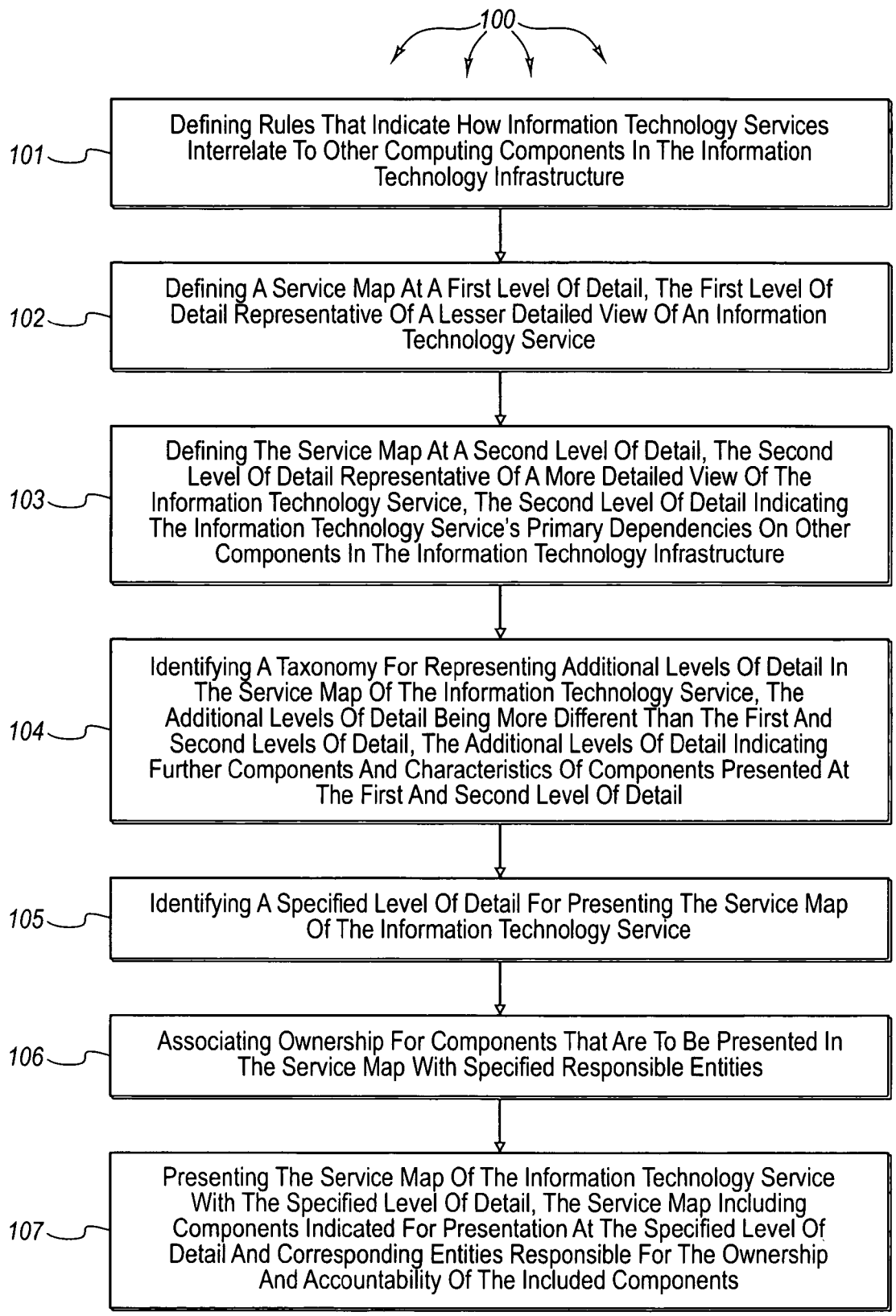
FIG. 1 illustrates an example flowchart of a method for creating a service map of a plurality of information technology resources.

The present invention extends to creating and using applicable information technology maps. In some embodiments, an applicable service map of a plurality of information technology resources included in an information technology infrastructure is created. Rules that indicate how information technology services interrelate to other computing components in the information technology infrastructure are defined. A service map is defined at a first level of detail. The first level of detail representative of a lesser detailed view of an information technology service. The service map is defined at a second level of detail. The second level of detail representative of a more detailed view of the information technology service and indicating the information technology service's primary dependencies on other components in the information technology infrastructure A taxonomy for-representing additional levels of detail in the service map of the information technology service is identified. The additional levels of detail being different than the first and second levels of detail and indicating further components and characteristics of components presented at the first and second level of detail. A specified level of detail for presenting the service map of the information technology service is identified. Ownership for components that are to be presented in the service map are associated with specified responsible entities. The service map of the information technology service is presented with the specified level of detail. The service map includes components indicated for presentation at the specified level of detail and corresponding entities responsible for the ownership and accountability of the included components.

In other embodiments, an information technology service map is used to simplify information technology infrastructure management. An information technology service map that maps a corresponding information technology infrastructure with a specified level of detail is accessed. The information technology service map represents dependencies between services and streams included in the information technology service map. The information technology service map is utilized to discretely apply a process theory to the information technology infrastructure.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 5:
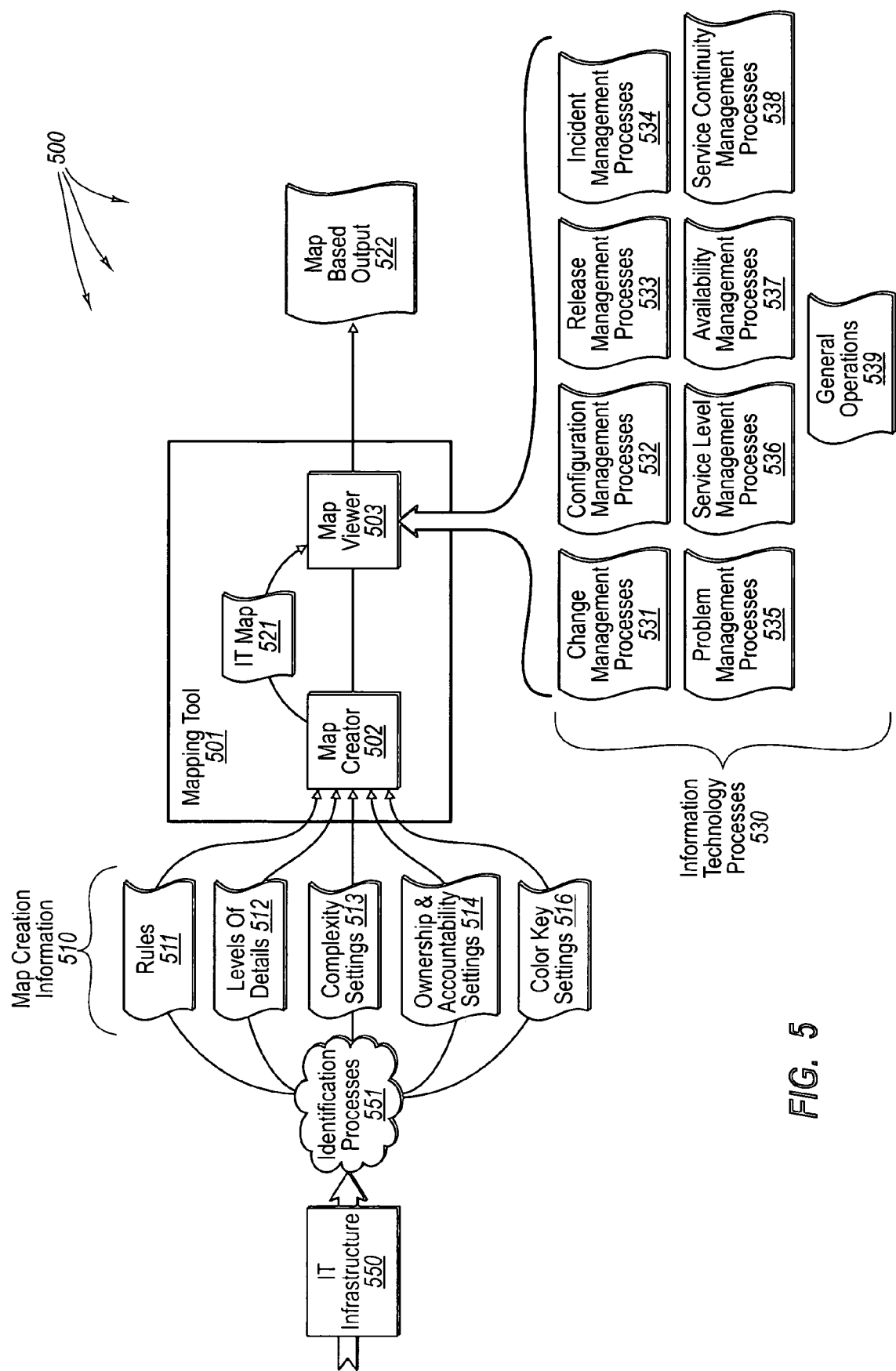
FIG. 5 illustrates an example architecture for creating and using an information technology service map.

FIG. 5 an example architecture 500 for creating and using an information technology service map. In some embodiments, architecture 100 is at least partially a computer architecture that facilitates creating and using an information technology service map. Thus, the components and data depicted in architecture 500 can be components and data of one or more computers system. The computer systems can be connected to one another by a communication mechanism such as, for example, a network (a Local Area Network ("LAN"), a Wide Area Network ("WAN"), the Internet, etc.) and/or a computer system bus. Thus, the computer systems can receive data from and send data to one another over the communication mechanism. Accordingly, the computer systems can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the communication mechanism.

As depicted, architecture 500 includes mapping tool 501. Generally, mapping tool 501 is configured to receive map creation information selected from one or more of mapping rules, levels of detail, complexity settings, ownership & accountability settings, and color key settings identified for an information technology infrastructure. Based on the received map creation information, mapping tool 501 can create an information technology map of the information technology infrastructure. Mapping tool 501 is also configured to utilize an information technology map to assist in identifying solutions to management problems associated with a corresponding information technology infrastructure. Mapping tool 501 can generate output in the form of subsections and/or highlighted portions of an information technology map.

Human based and/or automated identification processes can be used to identify various portions of map creation information. For example, one or more human based and/or automated identification process 551 can be used to identify each of mapping rules 511, levels of detail 512, complexity settings 513, ownership & accountability settings 514, and color key settings 516 for IT infrastructure 550.

Human based identification of map creation information can include map creation personnel, for example, experienced in the creation of information technology maps, interacting with an entity (e.g., through verbal and/or written communication) to identify map creation information for the entity's information technology infrastructure. For example, map creation personnel can interact with an owner or manager of IT infrastructure 550 to identify portions of map creation information 510. Automated identification of map creation information can include the use of network based query and discover mechanisms to obtain computer system (and other computing component) configurations and settings using network communication protocols. Query and discover mechanisms can communicate with computer systems (and other computing components) directly and/or with databases of compiled information technology information (e.g., stored collections of information technology configurations). Accordingly, the identification of map creation information for an information technology can be a fully human based process, a fully automated process, or a combination of human based and automated processes.

Figure 3:
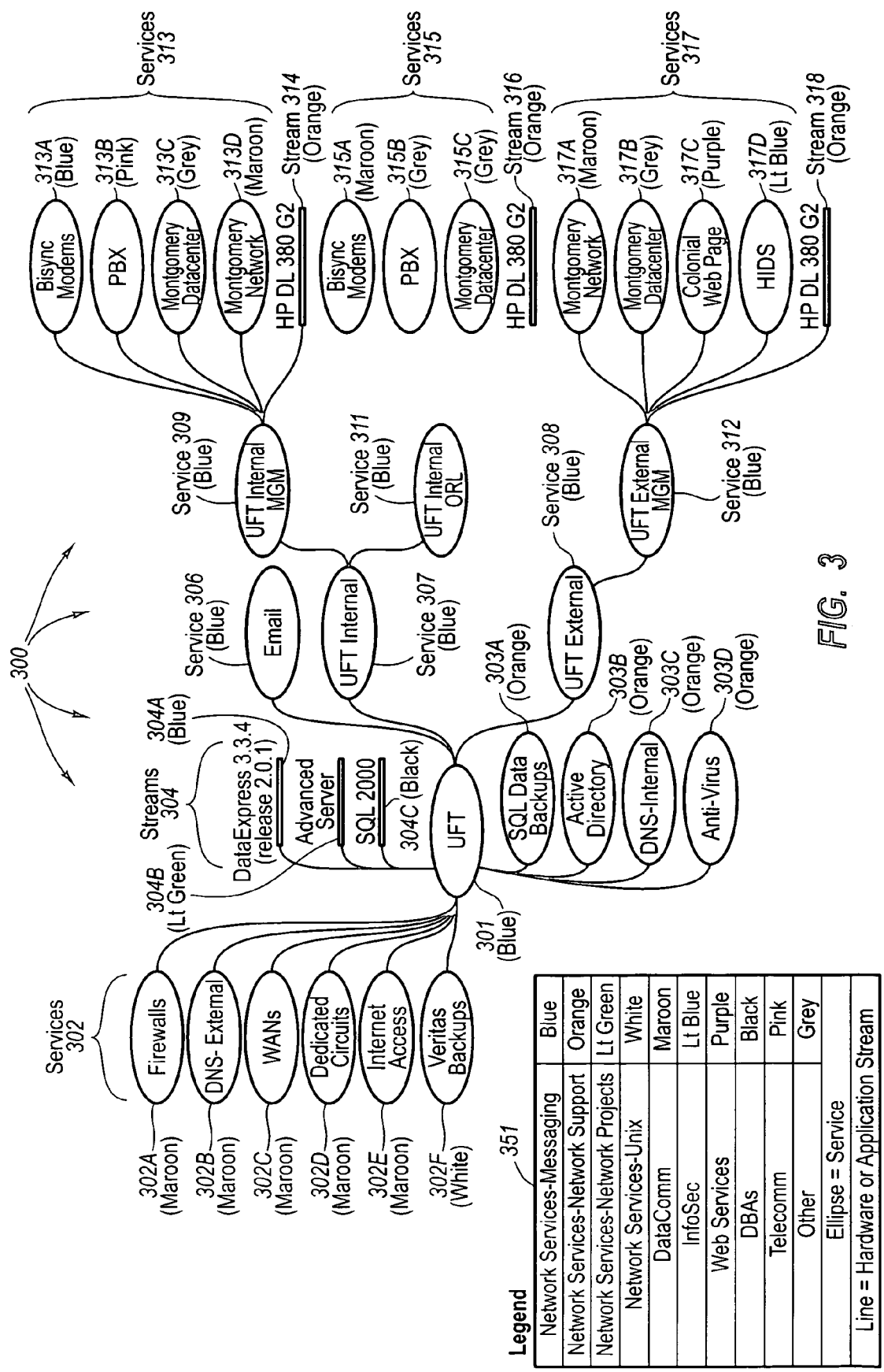
FIG. 3 illustrates a first example service map of a plurality of information technology resources.

FIG. 1 illustrates an example flow chart of a method 100 for creating a service map of a plurality of information technology resources. FIG. 3 illustrates a first example service map 300 of a plurality of information technology resources. Service map 300 can represent a service map of a portion of IT infrastructure 550. Method 100 will be described with respect to the components and data of architecture 500 and the information technology resources mapped in service map 300.

Method 100 includes an act of defining rules that indicate how information technology services interrelate to other computing components in the information technology infrastructure (act 101). For example, identification processes 551 can be used to define rules 511 that indicate how information technology services interrelate to other computing components within IT infrastructure 550. Rules 511 can be used to indicate that a service (e.g., universal file transfer ("UFT") service 301) depends on other services, hardware streams, application streams, and services settings.

Hardware streams can include a model and configuration of hardware, such as, for example, computer system A with host bus adapter, computer system A without host bus adapter, computer system B with wireless network card, etc. Application streams can include a software application with a particular configuration including patches, registry settings, etc., such as, for example, operating system version 5, application version 3.1, etc. Service settings can include settings in addition to core settings that make a map node be a 'member' of a particular service, such as, for example, mailbox service settings and public folder settings.

Method 100 includes an act of defining a service map at a first level of detail (act 102). For example, identification processes 551 can be used to define levels of detail 512 for a service map of IT infrastructure 550. From within levels of detail 512, a first level of detail can be selected. The first level of detail is representative of a lesser detailed view of an information technology service. For example, a first level of detail in service map 300 can be defined to include universal file transfer service 301.

Method 100 includes an act of defining the service map at a second level of detail (act 103). For example, identification processes 551 can be used to define levels of detail 512 for a service map of IT infrastructure 550. From within levels of detail 512, a second level of detail can be selected. The second level of detail is representative of a more detailed view of the information technology service. The second level of detail can indicate the information technology service's primary dependencies on other components in the information technology infrastructure. For example, a second level of detail in service map 300 can be defined to include a more detailed view than just universal file transfer 301. The more detailed view can indicate the primary dependencies of universal file transfer service 301 on other components in its information technology infrastructure (e.g., based on the defined rules defined in act 101).

Primary dependencies for a service can include dependencies on other services, hardware streams present for the service, application streams present for the service, and subservices of the service. For example, a second level of detail for service map 300 can be defined to indicate that universal file transfer 301 depends on services 302 (firewalls 302A, DNS-external 302B, wide area networks 302C, dedicated circuits 302D, internet access 302E, and veritas backup 302F), services 303 (SQL data backups 303A, active directory 302B, DNS-internal 303C, and anti-virus 303D), streams 304 (Data Express 3.3.4, release 2.0.1 304A, advanced server 304B, and SQL 2000 304C), service 306 (electronic mail), service 307 (universal file transfer internal), and service 308 (universal file transfer external) and possibly vice versa.

Method 100 includes an act of identifying a taxonomy for representing additional levels of detail in the service map of the information technology service (act 104). For example, identification processes 551 can be used to define levels of detail 512 for a service map of IT infrastructure 550. From within levels of detail 512, additional levels of detail for a service map of IT infrastructure 550 can be selected. The additional levels of detail can be different than the first and second levels of detail and can indicate further components and characteristics of components presented at the first and second level of detail. For example, an identified taxonomy can be used to further define a chain of dependencies in a service map. Thus, for service map 300, a taxonomy can be used to define dependencies for further streams and services that depend on universal file transfer service 301 (e.g., through dependency of intermediate services and stream).

For example, the taxonomy can be used to represent that universal file transfer internal MGM 309 and universal file transfer internal ORL 311 depend on universal file transfer internal 307 (and possibly vice versa). Similarly, the taxonomy can be used to represent that universal file transfer external MGM 312 depends on universal file transfer external 308 and possibly vice versa). Further dependencies in the chain can also be defined. For example, the taxonomy can be used to represent that services 313 (bisync modems 313A, PBX 313B, Montgomery Datacenter 313C, Montgomery network 313D) and stream 314 (HP DL 380 G2) depend on universal file transfer internal MGM 309 (and possibly vice versa). Likewise, the taxonomy can be used to represent that services 315 (Orlando network 315A, Orlando SAN 315B, and Orlando datacenter 315C) and hardware stream 316 (HP Proliant BL20P) depend on universal file transfer internal ORL 311 (and possibly vice versa). Similarly, the taxonomy can be used to represent that services 317 (Montgomery network 317A, Montgomery datacenter 317B, Colonial Web page 317C, and HIDS 317D) and hardware stream 318 (HP DL 380 G2) depend on universal file transfer external MGM 312 (and possibly vice versa).

Method 100 includes an act of identifying a specified level of detail for presenting the service map of the information technology service (act 105). For example, identification processes 551 can be used to define complexity settings 513 for presenting a service map of IT infrastructure 550. From within levels of complexity settings 513, a specified level of detail from levels of detail 512 can be selected. With respect to service map 300, a specified level of detail can indicate how far down a chain of services and streams that depend on universal file transfer 301 components are to be presented.

Identifying a specified (and appropriate) level of detail can be used to manage the complexity of a resulting service map. For example, by limiting the level of detail of dependencies from universal file transfer 301, service map 300 can be presented in an easier to understand format. However, the level of detail in a service map can be varied to accommodate the needs of a particular entity that is creating or that is going to use the service map. Within service map 300, the specified level of detail is three levels of dependency down the chain from universal file transfer 301.

Method 100 includes an act of associating ownership for components that are to be presented in the service map with specified responsible entities (act 106). For example, identification processes 551 can be used to ownership & accountability settings 514 for a service map of IT infrastructure 550.

From within ownership & accountability settings 514, ownership and accountability of components in IT infrastructure 550 can be identified. Settings from ownership & accountability settings 514 can be associated with components of IT infrastructure 550 that are to be presented in a service map (based on the specified level of detail).

Thus within map 300, the owners (or other accountable parties) of the services and streams presented in service map 300 can be associated with the services and streams. Legend 351 identifies a number of entities that can be responsible for the services and streams in service map 300. For example, universal file transfer service 301 can be associated with "Network Services-Messaging", active directory 303B can be associated with "Network Services-Network Support", PBX 313B can be associated with "Telecom", etc. Legend 351 further indicates that services are represented by ovals and that hardware and software streams are represented by lines.

In some embodiments, color key settings can be used to color key services and streams, for example, based on ownership and/or accountability. For example, color key settings 516 can define a color key scheme for color keying services and streams in IT infrastructure 550. Color key settings can be selected from color key settings 516 for presentation in a service map of IT infrastructure 550.

Method 100 includes an act of presenting the service map of the information technology service with the specified level of detail (act 107). Map creator 502 can receive one or more portions of map creation information 510, such as, for example, rules 511, levels of detail 512, complexity 513, ownership & accountability 514, and color key settings 516. Based on map creation information 510, map creator 502 can create IT map 521 (e.g., service map 300). A service map can include components indicated for presentation at the specified level of detail and corresponding entities responsible for the ownership of the included components. Map creator 502 can send IT map 521 to map viewer 503 for presentation. Map viewer 503 can present IT map 521, for example, at a video display device. For example, map viewer 503 can present service map 300.

Alternately, a human map creator can receive one or more portions of map creation information 510, such as, for example, rules 511, levels of detail 512, complexity 513, ownership & accountability 514, and color key settings 516. Based on map creation information 510, the human map creator can create IT map 521 (e.g., service map 300).

When a service or stream is presented in a service map it can be displayed in (or at least associated with) a color to indicate the responsible entity. Thus, services and streams in service map 300 are labeled with colors to indicate corresponding ownership in accordance with legend 351.

For example, legend 351 indicates that "Network Services-Messaging" is responsible for items in service map 300 that are color coded blue, that "DataComm" is responsible for items in service map 300 that are color coded maroon, that "Network Services-Unix®" is responsible for items in service map 300 that are color coded white, etc. Thus, for example, service 306 (electronic mail) can be presented as a blue oval to indicate that Network Services-Messaging is responsible for the electronic mail service. Similarly, stream 304B (advanced server) can be presented as a light green line to indicate that "Network Services-Network Projects" is responsible for the advanced server stream.

It should be understood that an information technology map can be created manually, in an automated manner, or through a combination of manual and automated actions in accordance with the methods and algorithms described herein. In some embodiments, map creation personnel, for example, experienced in the creation of information technology maps, interact with an entity, for example, through verbal and/or written communication, to determine a taxonomy of the entity's information technology infrastructure. Based on the interactions, the map creation personnel can define rules, such as, for example service dependencies, can identify various levels of detail of a taxonomy, can manage the complexity, can assign ownership and accountability for components, and can generate a color code. From the rules, levels of detail, and desired complexity the map personnel can then create an information technology map representative of the taxonomy that indicates component ownership and accountability in a color coded manner. For example, map personnel can draw an information technology map by hand.

In other embodiments, map personal can draw an information technology map using a computerized drafting program.

In further embodiments, rules, levels of detail, desired complexity, ownership and accountability, and color coding are entered (e.g., manually) into a computer system. For example, rules, levels of detail, desired complexity, ownership and accountability, and color coding can be input by map personnel into a database management system accessible to map creator 502. Map creator 502 can then read rules, levels of detail, desired complexity, ownership and accountability, and color coding from the database and generate a corresponding color coded information technology map in an automated fashion. It may be that similarly configured computer systems (or other computing components) are grouped together into collections such that a number of computer systems (or other computing components) can be associated with the same rules, levels of detail, desired complexity, ownership and accountability, and color coding. Collections can be linked to map creator 502, which utilizes the collections to generate a corresponding color coded information technology map.

In additional embodiments, a service map is created in a fully automated manner. For example, network based query and discover mechanisms can obtain computer system (and other computing component) configurations and settings using network communication protocols. From obtained configurations, map creator 502 may be able to infer or interpolate dependencies between the computer systems and/or other computing components. Information obtained in an automated fashion can also be linked to map creator 502, which utilizes the information to generate a corresponding color coded information technology map.

In some embodiments, a service map is established according to the methodology outlined below. By defining an information technology Service, such as Email, with a set taxonomy, one can define the complex dependencies of a multinode, complex dependency service. The methodology of building a Service Map for an information technology Service is the following:

1. Define the rules
    a. Services depend upon:
        i. Other Services
        ii. Hardware Streams (a model and configuration of hardware. e.g. Dell 2850 without HBA and Dell 2850 with HBA)
        iii. Application Streams (a software application with a particular configuration including patches, registry settings, etc. e.g. Windows 2003 Enterprise Server)
        iv. Service Settings (settings over and above core settings that make a node be a 'member' of a particular service. e.g. Mailbox Service Settings and Public Folder Service Settings)
2. Define the Service Map
    a. Define the first level (e.g. Email)
    b. Define the second level.
        i. What are all of the primary dependencies for the service?
            1. What other Services does the Service depend upon?(e.g. Active Directory, WANs, Firewalls, etc)
            2. What Hardware Streams are present for the Service?(e.g. Dell 2850 without HBA and Dell 2850 with HBA)
            3. What Application Streams are present for the Service?(e.g. Windows 2003 Enterprise Server and Exchange Server 2003)
            4. What are the sub-services of this Service? (e.g. Mailbox, Public Folder, IMC, Public Folder, Bridgehead, Front End, etc)
    c. Determine the taxonomy for further defining the Service Map down the chain (e.g. for Exchange-based Email service, what are the forests then domains then sites where each of the sub-services are present?)
    d. Manage the complexity
        i. If a particular service, hardware stream, or application stream is only present in a particular sub-service, then they should be represented at that level of the taxonomy (the further down the chain that a service or stream is represented in the Service Map, the greater the complexity)
    e. Assign ownership and accountability for each hardware stream, application stream, service, and grouping of service settings.
    f. Build a color-based key for each dependant information technology group and color code each object in the service map with the group that owns it.

Thus, generally an information technology service map defines a taxonomy of services and their dependencies (application, hardware and sub service work streams). Subsequent to the establishment of an information technology service map, the information technology service map can be used to apply various process theories to the represented information technology infrastructure.

Figure 2:
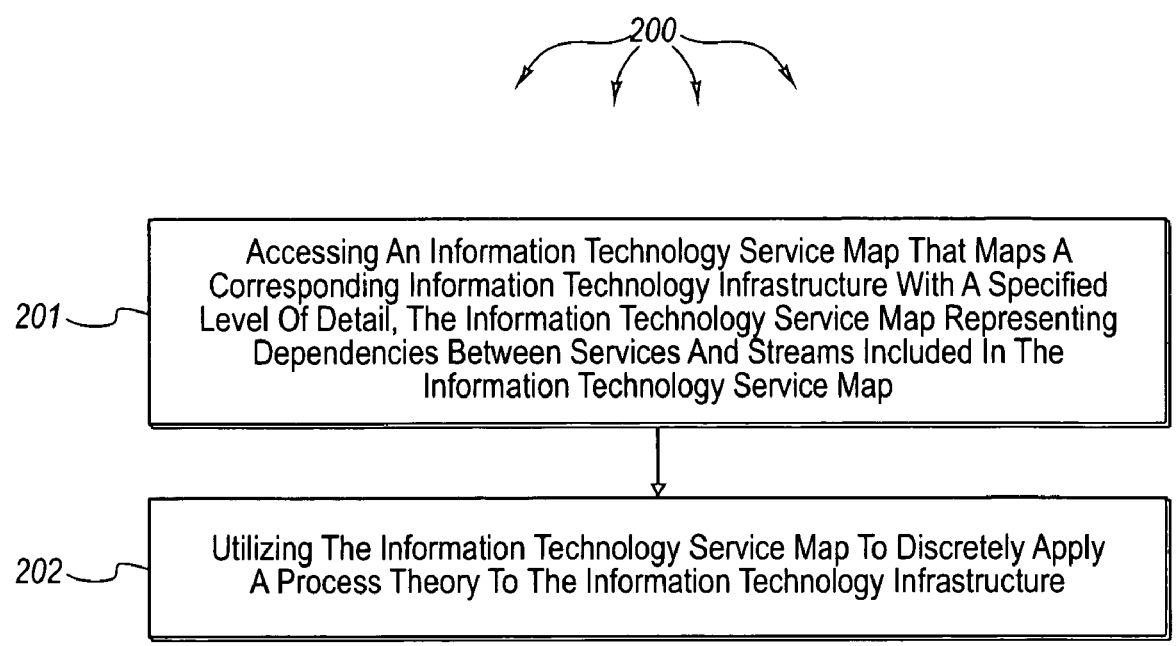
FIG. 2 illustrates example flowchart of a method for using an information technology service map to simplify information technology infrastructure management.

FIG. 2 illustrates example flowchart of a method 200 for using an information technology service map to simplify information technology infrastructure management. Service map 300 can represent a service map of a portion of IT infrastructure 550. Method 200 will be described with respect to the components and data in architecture 500 and the information technology resources mapped in service map 300.

Method 200 includes an act of accessing an information technology service map that maps a corresponding information technology infrastructure with a specified level of detail, the information technology service map representing dependencies between services and streams included in the information technology service map (act 201). For example, map viewer 503 can access IT map 521. Alternately, through presentation by map viewer 503 a human user of mapping tool 501 can access IT map 521. As previously described, IT map 521 maps at least a portion of IT infrastructure 550 in accordance with one or more portions of map creation information 510. In a further alternative, a map user can access a manually created IT map.

Method 200 includes an act of utilizing the information technology service map to discretely apply a process theory to the information technology infrastructure (act 202). Map viewer 503 can receive a process from one or more of information technology processes 530 including change management processes 531, configuration management processes 532, release management processes 533, incident management processes 534, problem management processes 535, service level management processes 536, availability management processes 537, service continuity management processes 538, and general operations 539. A received process can be input by a user of mapping tool 501 or accessed from a database accessible to mapping tool 501. Accordingly, map viewer 502 can utilize IT map 521 to apply a received process theory to IT infrastructure 550.

Map viewer 503 can provide mapped based output 522 to assist in determining the results of a process theory. Map based output 522 can include a subset and/or can highlight portions of IT map 521 to assist in determining the results of an applied process theory.

Alternately, a map user of a manually generated map can apply a process theory to the manually generated map to assist in determining the results of the process theory in a corresponding IT infrastructure. For example, a map user can use service map 300 to apply one or more of change management theories, configuration management theories, release management theories, incident management theories, problem management theories, service level management theories, availability management theories, service continuity management theories, security management theories, and general operation theories to a corresponding information technology infrastructure represented in service map 300.

Service map 300 (whether created by a human, a computer, or a combination of human and computer) can enable discussions of requirements at a logical level while maintaining dependency mappings to a corresponding physical level. Accordingly, an information technology service map can be used in a consulting engagement to distill simplicity from the complexity of the customer's environment in a standard and predictable way using a standard vocabulary. That is, after services and dependencies for an environment are enumerated using a service map, an instance of the service map can be used to drive consulting engagements, such as, for example, engagements to recommend best practice configuration templates, better automate configuration changes, perhaps inform discussions regarding process improvement, etc.

Change management can be implemented based on an information technology service map. Dependencies between information technology components can be expressly defined in an information technology service map. Thus, it can become evident the entities that need to be involved for risk assessment and communication associated with change management. Accordingly, an information technology service map can be used to determine who is to have input into a change management decision and who a change is to be communicated to.

Configuration management can be implemented based on an information technology service map. An information technology service map can provide a structure on which to build baselines and defines the dependencies for a service. Using a service map allows the creation of documentation in a granular and consistent manner. Thus, once an information technology service map is defined, a taxonomy for applying configuration management solutions (to report on complexity and to audit changes to nodes) can be created in a manageable way.

An information technology service map can be used to define, deploy, and manage configuration templates (e.g., collections of settings). For example, configurations for each hardware stream setting, application stream setting, and service setting can be packaged into a configuration template such as an XML file. The configuration template can list the settings and values, for example, as number of name/value pairs, that describe a configuration (e.g. registry key X=Y, WMI call A =B, LDAP query C=D, NIC driver=Version 1, Video Driver=Version 17. 1, etc). A configuration can be a, for example, a computer system including various software and hard components.

Subsequent to defining a hardware or application stream's in a template, that configuration can be applied across the information technology infrastructure regardless of what service a particular node supports; in other words, a Dell 2850 with HBA running Exchange should be configured with the same firmware, NIC card, NIC driver, Video Card, Video Driver, etc as a Dell 2850 with HBA running SQL and all Windows 2003 Enterprise Servers should be running the same core service pack and hotfixes (any changes above and beyond the core application and hardware stream settings are applied at the Service Setting groupings). An information technology service map significantly reduces the complexity of managing these configurations. In a global infrastructure, configuration templates are reduced from the hundreds of thousands of per-node templates to mere hundreds of service map-based templates (or fewer).

Release management can be implemented based on an information technology service map. For example, by using an information technology service map, one can apply the principles of release management to each hardware stream, application stream, and grouping of service settings. Thus, planning releases for a distributed infrastructure can be done more efficiently. Further, documentation can be created per stream and updated along with the release management process. Accordingly, the number of releases needed in an infrastructure can be reduced by changing the approach from node based (possibly hundreds of thousands) to stream based (possibly hundreds).

Incident management (e.g., escalations) can be implemented based on an information technology service map. Using an information technology map escalation matrices can be more easily quantified. For example, by defining the dependencies between groups and nodes, escalation matrices can be defined on a hardware stream, application stream, and service basis Problem management (e.g., trending) can be implemented based on an information technology service map. For example, an information technology service map can be used to define categories for and facilitate more accurate and valuable incident and problem trending. An incident's categorization options for root cause can be the hardware streams, application streams, and services that support or comprise the service itself. Thus, trend reports can more accurately resemble the actual causes and impact of outages.

Service level management (e.g., creating Operating Level Agreements ("OLAs")) can be implemented based on an information technology service map. An information technology service map can be used to quantify agreement criteria for OLAs. For example, by using an information technology service map, it becomes more evident which services need to be covered in Operating Level Agreements (OLAs) with each supporting group. Thus, multiple OLAs can be created with adequate granularity or a single OLA can be constructed with discreet sections and appropriate verbiage for each service. The legend of an information technology service map can be used to indicate existing OLAs and expiration dates.

Figure 4:
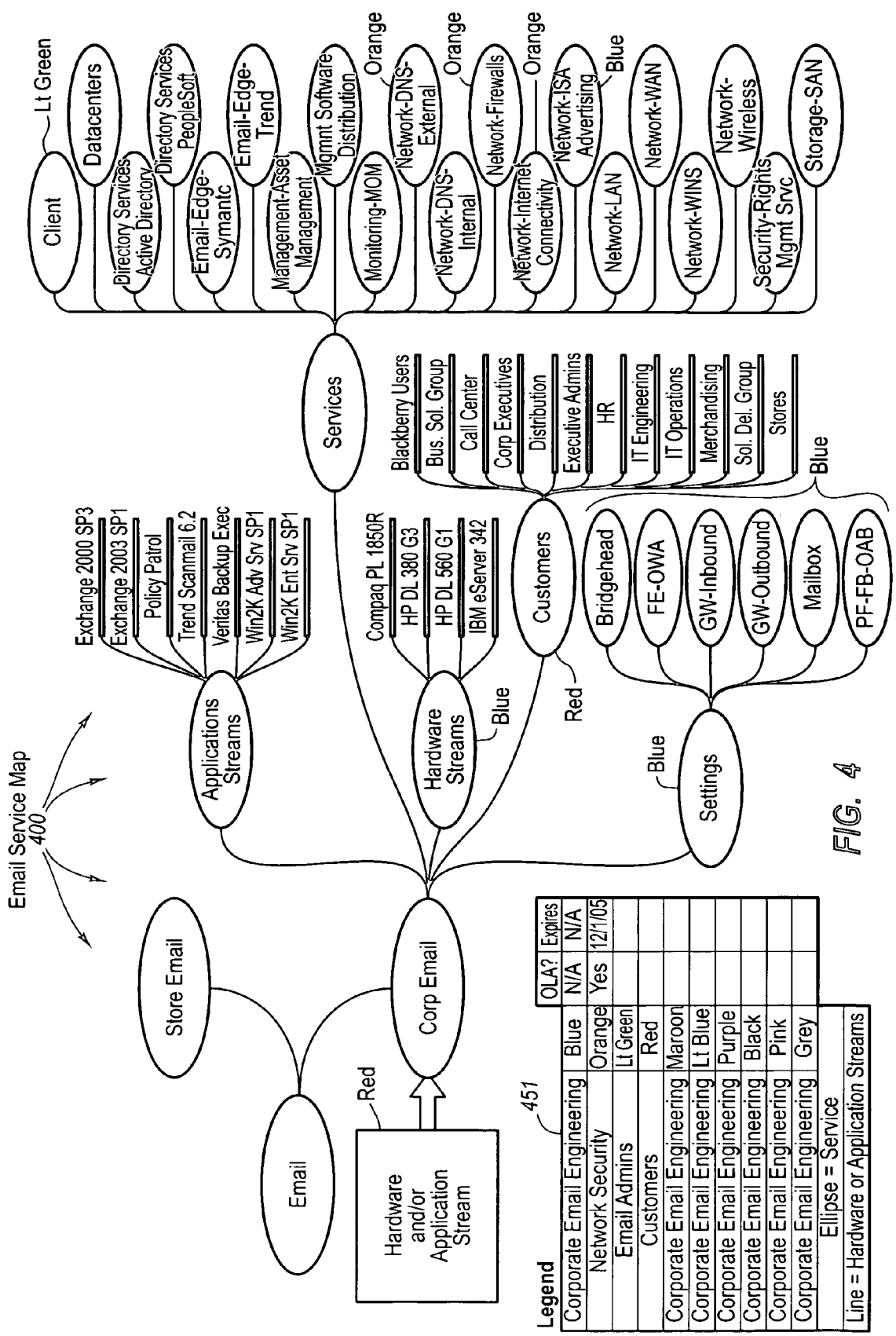
FIG. 4 illustrates a second example service map of a plurality of information technology resources.

FIG. 4 illustrates a second example service map 400 of a plurality of information technology resources. As depicted in legend 451, OLA exists with "Network Security" and expires Dec. 1, 2005. The OLA governs services that are color coded orange within service map 400.

Availability management (e.g., identifying risks, mitigation plans, design decisions, planning contingencies for risks, troubleshooting guides, and support guides) can be implemented based on an information technology service map. For example, by using an information technology service map, an information technology organization can identify risks more granularly and accurately. The question 'what risks exist for our email service?' is a relatively high level question. On the other hand, asking 'what risks exist for dell 2850 running as a mailbox server?' is relatively more granular. When risk identification is completed for each hardware stream, application stream, and supporting service, granular risk identification is possible. In some embodiments, the risk for an information technology service is the compilation of the risks to each supporting component in the service map.

Furthermore, an information technology service map can be used to define failure modes. Thus, each failure mode can be considered when determining if the current mitigation/design option is sufficient for business needs. Accordingly, design criteria and decisions can be much more granular and consumable. Risk mitigations and architectural decisions can be planned per failure mode defined via an information technology service map.

Even further, by using an information technology service map to define failure modes for each hardware stream, application stream, and service that supports a service, a troubleshooting script for front line staff members is also defined. If a service is impacted, the service map can be reviewed and troubleshot appropriately to navigate to the accurate stream or service. Then, any failure modes for that area can be examined. Contingency plans can be written for each failure mode. Thus, front line staff members may know exactly how to respond to the outage. If the particular failure mode is not already defined with contingency, the front line member can escalate to top tier. Failure modes (troubleshooting scripts) can be updated with associated contingencies (support guides).

Service continuity management can be implemented based on an information technology service map. For example, with an information technology service map defined, the dependencies can be clearly and plainly represented. Thus, for an information technology organization to plan continuity for a Service, they can plan continuity for each supporting service in the information technology service map.

Security management can be implemented based on an information technology service map. For example, with an information technology service map defined, security properties and dependencies across different hardware streams setting, application streams, and services can be identified. An administrator can then use the identified security properties and dependencies in security planning and in implementing security measures.

Other general operations (e.g., task lists and work instructions) can also be implemented based on an information technology service map. For example, using an information technology service map as a guide, and information technology organization can quantify task lists (what are the routine tasks that need to be performed at what frequency) and work instructions (detailed description and explanation of how to accomplish each task) per hardware stream, application stream, and supporting service. Task lists and work instructions for an information technology Service can be simply a concatenation of the tasks lists and work instructions from each supporting hardware stream, application stream, and service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system including a processor and system memory, a computer implemented method for creating an applicable service map of a plurality of information technology resources included in an information technology infrastructure, the computer implemented method comprising:

an act of defining rules that indicate how information technology services interrelate to other computing components in the information technology infrastructure;

an act of defining a service map at a first level of detail, the first level of detail representative of a lesser detailed view of an information technology service;

an act of defining the service map at a second level of detail, the second level of detail representative of a more detailed view of the information technology service, the second level of detail indicating the information technology service's primary dependencies on other components in the information technology infrastructure;

an act of identifying a taxonomy for representing additional levels of detail in the service map of the information technology service, the additional levels of detail being different than the first and second levels of detail, the additional levels of detail indicating further components and characteristics of components presented at the first and second level of detail;

an act of identifying a specified level of detail for presenting the service map of the information technology service;

an act of associating ownership for components that are to be presented in the service map with specified responsible entities; and an act of presenting the service map of the information technology service with the specified level of detail, the service map including components indicated for presentation at the specified level of detail and corresponding entities responsible for the ownership and accountability of the included components.

2. The method as recited in claim 1, wherein the act of defining rules that indicate how information technology services interrelate to other computing components in the information technology infrastructure comprises an act of defining rules that indicate how information technology services interrelate to one or more of other services, hardware streams, application streams, and service settings.

3. The method as recited in claim 1, wherein the act of defining the service map at a second level of detail comprises an act of identifying the primary dependencies for the information technology service.

4. The method as recited in claim 3, wherein the act of identifying the primary dependencies for the information technology service comprises an act of identifying one or more of other services the information technology service depends on, hardware streams present for the information technology service, application streams present for the information technology service, and sub-services of the information technology service.

5. The method as recited in claim 1, wherein the act of associating ownership and accountability for components that are to be presented in the service map with specified entities comprises an act of associating ownership and accountability for one or more of a hardware stream, an application stream, a service, and a grouping of service settings, with specified responsible entities.

6. The method as recited in claim 1, wherein the act of presenting the service map of the information technology service with the specified level of detail comprises:
   an act of building a color-based key for each responsible entity;
   an act of color coding each component in the service map in accordance with the color-based key of the responsible entity for the component; and
   an act of presenting the color coded components in the service map of the information technology service.

7. A computer system, comprising:
   one or more processors;
   system memory; and
   one or more computer-readable media having stored thereon computer-executable instructions representing a map creator and a map viewer, wherein
   the map creator is configured to:
      receive defined rules that indicate how information technology services interrelate to other computing components in an information technology infrastructure;
      receive a defined first level of detail for an information technology service map, the first level of detail representative of a lesser detailed view of an information technology service;
      receive a defined second level of detail for the information technology service map, the second level of detail representative of a more detailed view of the information technology service, the second level of detail indicating the information technology service's primary dependencies on other components in the information technology infrastructure;
      receive an identified taxonomy for representing additional levels of detail in the information technology service map of the information technology service, the additional levels of detail being different than the first and second levels of detail, the additional levels of detail indicating further components and characteristics of components presented at the first and second level of detail;
      identify a specified level of detail for presenting the information technology service map of the information technology service;
      associate ownership for components that are to be presented in the information technology service map with specified responsible entities; and
      create the information technology service map of the information technology service with the specified level of detail, the information technology service map including components indicated for presentation at the specified level of detail and corresponding entities responsible for the ownership and accountability of the included components; and the map viewer is configured to:
      access information technology service maps created by the map creator; and
      utilize the information technology service maps to discretely apply a process theory to the information technology infrastructure.

8. The computer system as recited in claim 7, wherein the map creator being configured to receive defined rules that indicate how information technology services interrelate to other computing components in the information technology infrastructure comprises the map creator being configured to receive defined rules that indicate how information technology services interrelate to one or more of other services, hardware streams, application streams, and service settings.

9. A computer program product for use at a computer system, the computer program product for implementing a method for creating an applicable service map of a plurality of information technology resources included in an information technology infrastructure, the computer program product comprising one or more computer storage media having stored there on computer-executable instructions that, when executed at a processor, cause the computer system to implement the method, including the following:
   define rules that indicate how information technology services interrelate to other computing components in the information technology infrastructure;
   define a service map at a first level of detail, the first level of detail representative of a lesser detailed view of an information technology service;
   define the service map at a second level of detail, the second level of detail representative of a more detailed view of the information technology service, the second level of detail indicating the information technology service's primary dependencies on other components in the information technology infrastructure;
   identify a taxonomy for representing additional levels of detail in the service map of the information technology service, the additional levels of detail being different than the first and second levels of detail, the additional levels of detail indicating further components and characteristics of components presented at the first and second level of detail;
   identify a specified level of detail for presenting the service map of the information technology service;
   associate ownership for components that are to be presented in the service map with specified responsible entities; and
   present the service map of the information technology service with the specified level of detail, the service map including components indicated for presentation at the specified level of detail and corresponding entities responsible for the ownership and accountability of the included components.

10. The computer program product as recited in claim 9, further comprising computer-executable instructions that, when executed, cause the computer system to utilize the information technology service map to discretely apply a process theory to the information technology infrastructure.

11. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to define, deploy, and manage configuration templates.

12. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to plan releases for the information technology infrastructure.

13. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to quantify escalation matrices for the information technology infrastructure.

14. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to define categories for incident and problem trending for the information technology infrastructure.

15. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to define agreement criteria for OLAs for the information technology infrastructure.

16. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to apply risk management principles to the information technology infrastructure.

17. The computer program product as recited in claim 16, wherein computer-executable instructions that, when executed, cause the computer system to utilize the information technology service map to apply risk management principles to the information technology infrastructure comprise computer-executable instructions that, when executed, cause the computer system to utilize information in the technology service map to apply a risk management principle selected from among: identifying failure modes for an information technology service, planning risk mitigations and architecture decisions per failure mode identified via the service map, using the service map identified failure modes as a troubleshooting script, using the service map contingency plans for each failure mode as support guides.

18. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to plan information technology service continuity for the information technology infrastructure.

19. The computer program product as recited in claim 10, wherein computer-executable instructions that, when executed, cause the computer system to utilize the information technology service map to discretely apply a process theory to the information technology infrastructure comprise computer-executable instructions that, when executed, cause the computer system to utilize the information technology service map to quantify operational task lists and work instructions for the information technology infrastructure.

20. The computer program product as recited in claim 9, wherein computer-executable instructions that, when executed, cause the computer system to present the service map of the information technology service with the specified level of detail comprise computer-executable instructions that, when executed, cause the computer system to:
   build a color-based key for each responsible entity;
   color code each component in the service map in accordance with the color-based key of the responsible entity for the component; and
   present the color coded components in the service map of the information technology service.

* * * * *